(12) United States Patent
Wang et al.

(10) Patent No.: US 10,814,720 B2
(45) Date of Patent: Oct. 27, 2020

(54) CENTRALIZED FULL-TIME ELECTRIC FOUR-WHEEL DRIVE SYSTEM

(71) Applicant: Jilin University, Changchun, Jilin (CN)

(72) Inventors: Junnian Wang, Jilin (CN); Bin Yang, Jilin (CN)

(73) Assignee: Jilin University, Changchun (CN)

( * ) Notice: Subject to any disclaimer, the term of this patent is extended or adjusted under 35 U.S.C. 154(b) by 30 days.

(21) Appl. No.: 16/355,865

(22) Filed: Mar. 18, 2019

(65) Prior Publication Data
US 2019/0283578 A1  Sep. 19, 2019

(30) Foreign Application Priority Data

Mar. 19, 2018 (CN) .......................... 2018 1 0222314

(51) Int. Cl.
| | |
|---|---|
| *B60K 17/346* | (2006.01) |
| *B60K 17/04* | (2006.01) |
| *B60K 17/356* | (2006.01) |
| *B60K 1/02* | (2006.01) |
| *F16H 48/10* | (2012.01) |
| *F16H 48/08* | (2006.01) |
| *B60K 1/00* | (2006.01) |
| *F16H 48/00* | (2012.01) |

(52) U.S. Cl.
CPC ............ *B60K 17/3462* (2013.01); *B60K 1/02* (2013.01); *B60K 17/046* (2013.01); *B60K 17/356* (2013.01); *F16H 48/10* (2013.01); *B60K 2001/001* (2013.01); *F16H 48/08* (2013.01); *F16H 2048/04* (2013.01)

(58) Field of Classification Search
CPC .... F16H 2048/02–04; F16H 48/08–2048/087; F16H 48/10–11; B60K 17/34; B60K 17/344–3467; B60K 17/046
See application file for complete search history.

(56) References Cited

U.S. PATENT DOCUMENTS

| | | | | |
|---|---|---|---|---|
| 5,387,161 | A * | 2/1995 | Shibahata | ............... F16H 48/08 475/150 |
| 7,004,876 | B2 * | 2/2006 | Puiu | ................... B60K 17/3462 475/205 |
| 7,651,426 | B2 * | 1/2010 | Yokoyama | ............. B60K 6/365 475/19 |
| 10,569,647 | B2 * | 2/2020 | Yamamura | ........... B60K 17/356 |
| 2017/0059023 | A1 * | 3/2017 | Severinsson | ......... B60K 17/165 |

* cited by examiner

*Primary Examiner* — Ernesto A Suarez
*Assistant Examiner* — James J Taylor, II
(74) *Attorney, Agent, or Firm* — Wayne & Ken, LLC; Tony Hom

(57) ABSTRACT

A centralized full-time electric four-wheel drive system, including: a housing; a central differential; a main drive unit, whose power output gear meshes with the ring gear of the central differential; a dual-rotor motor having a first and a second output gear at either end; a rear-axle differential; a first planetary gearset (PG), whose sun gear and ring gear connect to the carrier of the central differential and the housing respectively; a second PG with common carrier of the first PG, whose sun gear connects to the sun gear of the central differential and ring gear meshes with the first output gear; a third PG, whose sun gear and ring gear connect to the semi-axle of the rear-axle differential and the housing respectively; a forth PG with common carrier of the third PG, whose sun gear connects to the rear-axle differential cage and ring gear meshes with the second output gear.

10 Claims, 8 Drawing Sheets

CENTRALIZED FULL-TIME ELECTRIC FOUR-WHEEL DRIVE SYSTEM

CROSS-REFERENCE TO RELATED APPLICATIONS

This application claims the benefit of priority from Chinese Patent Application No. CN201810222314.4, filed on Mar. 19, 2018. The content of the aforementioned application, including any intervening amendments thereto, is incorporated herein by reference in its entirety.

TECHNICAL FIELD

The present disclosure relates to the field of automotive transmission technology, and more particularly to a centralized full-time electric four-wheel drive system.

BACKGROUND OF THE PRESENT INVENTION

In recent years, with the improvement of people's living standards and the continuous advancement of technology, people have put forward higher and higher requirements for the quality of vehicles. From the initial demand as a means of transportation, the demand has gradually transitioned towards safety, comfort, economy and driving pleasure. Demand for high-performance vehicles is increasing year by year. Therefore, research and development investment in high-performance vehicles is necessary.

The driving form of the conventional vehicle mainly comprises two-wheel drive and four-wheel drive. In any of the drive types, most of the car axles comprise a drive axle, wherein the differential is an important component in the drive axle. Due to the "different speed-same torque" principle of the differential, the drive torque transmitted by the engine can only be uniformly distributed to the wheels on both sides, so that the ground adhesion cannot be well utilized in the case of uneven road surface adhesion. Even, the wheel may slip on the side with low adhesion, causing the vehicle to lose its driving ability. In addition, when the car is turning at a high speed, since the load on the inner side is transferred to the outer side, the inner wheel may reach the adhesion limit, causing slippage to destabilize the car. If the drive torque can be arbitrarily distributed between the wheels on both sides, the above trapped and unstable conditions can be greatly reduced. When the wheels on both sides are ununiformly adhered to the road surface, the drive torque can be transferred from the low-adhesion side to the high-adhesion side, thereby eliminating the condition of wheel slippage of the low-adhesion side. When the car is turning at a high speed, if the drive torque is transferred from the inner wheel to the outer wheel, the inner wheel can be prevented from slipping, and the lateral force margin of the whole vehicle is increased. In addition, an additional yaw moment is generated, which may promote and guide turning of the vehicle, improving vehicle turning maneuverability and extreme turning.

According to the transmission system layout, the drive system can be divided into centralized drive and distributed drive. The former is used in both traditional internal combustion engine and new energy vehicles, while the latter is often placed on each wheel and directly drives the vehicle in a distributed manner through hub motor, wheel motor or hub hydraulic motor. The distributed drive can realize four-wheel drive conveniently, and the general hub motor is placed in the wheel to directly drive the wheel without excessive transmission system, so the structure is simple, the space is small, and the transmission efficiency is high, which is thus an excellent transmission form. However, at this stage, the technical bottlenecks such as the low power density of the hub motor, the poor reliability of the motor working environment, and the decrease in the smoothness of the car due to the increased unsprung weight of the hub motor have seriously affected its large-scale use. Therefore, most of the electric cars still adopt a centralized drive similar to an internal combustion engine driven car. In a system where an internal combustion engine or the centralized hybrid powertrain or a driving motor is used as a single centralized power source, it is often arranged in the front axle. This single centralized power source (typically a hybrid system for a plurality of power sources, with the majority of a centralized hybrid powertrain formed by integration with the internal combustion engine, transmission or coupling device) can only use the traditional central centralized transmission system. Therefore, if the central centralized drive vehicle requires four-wheel drive, there is a need for a transfer case device or a coupling device for distributing a part of the power and transmitting it to other driving axles (of course, for electric vehicles, since the electric motor is often much smaller in dimension and cheaper than the internal combustion engine or hybrid powertrain, for some electric four-wheel drive models, a single motor is adopted for each of front and rear axle and matches with a main retarder and a differential to provide driving power therefor, such as model S Tesla electric vehicle. Since this configuration of the front and rear axle has two different power sources, this does not belong to the range of centralized drive of the present application).

Based on the differences in structure and the ability of the four-wheel drive system, the traditional four-wheel drive is divided into timely four-wheel drive, full-time four-wheel drive and time-sharing four-wheel drive. A timely four-wheel drive vehicle often uses two identical gears on the output shaft side of the transmission to simultaneously transmit power to the front and rear axles, and adds electromagnetic multi-plate clutches in advance of the non-primary drive axle (usually the rear axle) to achieve timely power transmission to the rear axle by the transmission shaft. When the electromagnetic clutch is combined, the rear axle can generally obtain up to half of the total drive torque. The so-called timely means that the power of the clutch is not always transmitted to the rear axle, but rather four-wheel drive is achieved only when the front wheel is slipping or four-wheel drive is needed for a short time; since its transmission mode is gear transmission combined with electromagnetic multi-plate clutch, it can only transfer half of the maximum output torque of the whole vehicle to the non-main drive wheel in a short time. Therefore, this type of car has common passing performance and can only adapt for mild off-road use, and yet it is most economical. Full-time four-wheel drive often uses the inter-axle differential to connect the transmission shafts of the front and rear axles, and the torque distribution of the front and rear axles is generally uniformly distributed and in a few cases uniformly distributed. Since the ordinary open differential is featured with "different speed-same torque", in order to ensure that the driving force of the other axle is also reduced when one axle wheel slips causing the passage ability to decrease, the inter-axle differential of the full-time four-wheel drive system generally uses the limited slip differential or an inter-axle differential with differential lock function to realize the front-to-back axle transfer of torque. The full-time four-wheel drive car is driven by four wheels for all driving time, and Since of the general addition of the shaft limit slip differential or differential lock, the vehicle's power, driving stability and passage ability are much better than the timely four-wheel drive. However, due to its complex structure and high cost, it is generally only used in high-end four-wheel drive SUV or high-end four-wheel drive sedan, and Since it is always four-wheel drive, it generally cannot achieve active torque distribution towards single-axle drive mode, the driving economy is poor. Time-sharing four-wheel drive often adds a transfer case in the transmission or after the transmission, the power is transmitted to the non-main drive axle (usually the front axle) by switching meshing and withdrawal of the gears in the transfer case. The transfer case also generally has a low speed gear to further amplify the engine torque to meet the extreme off-road capability requirements. The time-sharing four-wheel drive is economical when single-axle drive is adopted. However, when the power is transmitted by manipulating the transfer case simultaneously to the front and rear axles and a four-wheel drive is formed, since generally there is no inter-axle differential, it cannot be used at a high speed on a normal paved road, and can only be used for a low speed off-road use on a non-paved road surface. Moreover, due to the structure of the car body, the weight of the car, lack of differential, the tires, etc., the economy and steering stability of the whole vehicle during the four-wheel drive are much poorer than the full-time four-wheel drive or the timely four-wheel drive.

On the whole, the full-time four-wheel drive is relatively better. However, for the full-time four-wheel drive system in the prior art, since the ordinary differential used has the characteristics of "different speed-same torque", when adhesion of the front and rear axles of the vehicle is inconsistent, the wheels on the axle with the low adhesion side may slip, causing the car to be trapped and unable to travel. On the other hand, when the car is accelerating and the load is transferred from the front axle to rear axle, this may also cause the front axle wheel to reach the adhesion limit to cause slippage and instability of the car. Although various prior art inter-axle limited slip differentials or inter-axle differential locks can be used to partially or fully lock the transmission shafts that connect with the front and rear axles to achieve torque transfer from a low adhesion axle to a high adhesion axle, avoiding the wheel slippage and improving vehicle passage ability, the inter-axle transfer distribution of torque is achieved in a one-way manner, that is, the drive torque can only be transferred from the axle with a fast speed to the axle with a slow speed. This does not improve the maneuverability and drive performance of the vehicle under various road conditions. In addition, multiple sets of friction plates in the limited slip differential have mechanical sliding friction when pressed and disconnected, which increases reactive power consumption.

Therefore, the present disclosure is directed to overcoming at least one of the above-mentioned shortcomings of the prior art, and proposes a centralized full-time electric four-wheel drive system having both inter-axle and inter-wheel torque directional distribution functions. This system can be applied to the full-time electric four-wheel drive vehicles, and can also be applied to four-wheel drive hybrid vehicles or four-wheel drive internal combustion engine powered vehicles by changing the power source.

SUMMARY OF THE PRESENT INVENTION

The object of the present disclosure is to solve the problem that the drive torque on the four-wheel drive vehicle cannot simultaneously realize the active directional distribution between the axles and the active directional distribution between the wheels. The magnitude and direction of the output torque of the first output end and the second output end of the dual rotor motor are controlled, and thus the magnitude and direction of the torque distribution between the front and rear axles of the vehicle are controlled.

The technical solution provided by the present disclosure is:

A centralized full-time electric four-wheel drive system, comprising:

a main drive unit, a power output shaft of the main drive unit meshing with a gear ring of a center differential;

wherein a sun gear of the center differential is connected to a first output shaft, a planetary carrier of the center differential is connected to a second output shaft, the first output shaft is connected to a housing of a first bevel gear differential through a speed reduction mechanism, and the second output shaft is connected to a housing of a second bevel gear differential through the speed reduction mechanism;

a first planetary gear set comprising a first sun gear, a first planetary gear, a first planetary carrier, and a first gear ring;

a second planetary gear set comprising a second sun gear, a second planetary gear, and a second gear ring;

wherein the first sun gear is connected to the planetary carrier of the center differential and is sleeved on the first output shaft, the second sun gear is connected to the first output shaft, the first planetary gear and the second planetary gear are coaxially disposed on the first planetary carrier, and the second gear ring is sleeved on the first output shaft;

a third planetary gear set comprising a third sun gear, a third planetary gear, a second planetary carrier, and a third gear ring, a fourth planetary gear set comprising a fourth sun gear, a fourth planetary gear and a fourth gear ring;

wherein the third sun gear is connected to a second half axle of a rear axle, the fourth sun gear is connected to the housing of the first bevel gear differential and is sleeved on the second half axis of the rear axle, the third planetary gear and the fourth planetary gear are coaxially disposed on the second planetary carrier, a first half axle gear of the first bevel gear differential is connected to the first half axis of the rear axle, and a second half axle gear of the first bevel gear differential is connected to the second half axis of the rear axle; and a dual rotor motor having a first output end gear and a second output end gear disposed at either end thereof, the first output end gear meshing with the second gear ring, the second output end gear meshing with the fourth gear ring.

Preferably, the center differential further comprises a fifth planetary gear that is uniformly distributed circumferentially about the planetary carrier of the center differential and sleeved and supported on the planetary carrier of the center differential in a centrally hollowed manner, two adjacent fifth planetary gears mesh with one another, an inner side of the fifth planetary gear meshes with the sun gear of the center differential, and an outer side of the fifth planetary gear meshes with the gear ring of the center differential.

Preferably, the first bevel gear differential further comprises:

a first planetary gear shaft passing through a center of the housing of the first bevel gear differential and rotatably supported on the housing of the first bevel gear differential, a first conical planetary gear fixedly mounted on the first planetary gear shaft and simultaneously externally meshing with the first half axle gear and the second half axle gear, and a second conical planetary gear fixedly mounted on the first planetary gear shaft and simultaneously externally meshing with the first half axle gear and the second half axle gear;

wherein the first conical planetary gear and the second conical planetary gear are symmetrically disposed.

Preferably, a third half axle gear of the second bevel gear differential is connected to a first half axle of a front axle, and a fourth half axle gear of the second bevel gear differential is connected to a second half axle of the front axle.

Preferably, the second bevel gear differential further comprises:

a second planetary gear shaft passing through a center of the housing of the second bevel gear differential and rotatably supported on the housing of the second bevel gear differential, a third conical planetary gear fixedly mounted on the second planetary gear shaft and simultaneously externally meshing with the third half axle gear and the fourth half axle gear, and a second conical planetary gear fixedly mounted on the second planetary gear shaft and simultaneously externally meshing with the third half axle gear and the fourth half axle gear;

wherein the third half axle gear and the fourth half axle gear are symmetrically disposed.

Preferably, the first planetary gear and the second planetary gear are uniformly distributed circumferentially about the first planetary carrier and sleeved and supported on the first planetary carrier in a centrally hollowed manner; two adjacent first planetary gears mesh with one another, an inner side of the first planetary gear meshes with the first sun gear, and an outer side of the first planetary gear meshes with the first gear ring; two adjacent second planetary gears mesh with one another, an inner side of the second planetary gear meshes with the second sun gear, and an outer side of the second planetary gear meshes with the second gear ring.

Preferably, the third planetary gear and the fourth planetary gear are uniformly distributed circumferentially about the second planetary carrier and sleeved and supported on the second planetary carrier in a centrally hollowed manner; two adjacent third planetary gears mesh with one another, an inner side of the third planetary gear meshes with the third sun gear, and an outer side of the third planetary gear meshes with the third gear ring; two adjacent fourth planetary gears mesh with one another, an inner side of the fourth planetary gear meshes with the fourth sun gear, and an outer side of the fourth planetary gear meshes with the fourth gear ring.

Preferably, the power output shaft of the main drive unit meshes with the gear ring of the center differential through an output gear; the first output shaft is connected to a driving bevel gear of the speed reduction mechanism, the housing of the first bevel gear differential is connected to a driven bevel gear of the speed reduction mechanism, the driving bevel gear and the driven bevel gear meshes with each other for transmission.

Preferably, the second output shaft is connected to the second bevel gear differential through a transmission shaft, a universal transmission device is arranged at each end of the transmission shaft.

Preferably, wherein a planetary row characteristic parameter of the center differential is 2; a planetary row characteristic parameter of the first planetary gear set is equal to that of the second planetary gear set; and a planetary row characteristic parameter of the third planetary gear set is equal to that of the fourth planetary gear set.

The beneficial effects described in the present disclosure are:

(1) The centralized full-time electric four-wheel drive system provided by the present disclosure solves the drawbacks of the conventional differential "different speed-same torque", and can realize the function of "different speed-different torque". That is, in the case that speed between axles or wheels is different, a same addition or subtraction of any absolute value can be carried out on the torques of both sides of the differential to achieve unequal power output between both sides or front and rear axles. This fundamental technical feature can meet the requirements for the vehicle's power, economy, cornering maneuverability, steering stability and passage ability, thus improving the overall performance of the vehicle.

(2) The centralized full-time electric four-wheel drive system provided by the present disclosure solves the technical bottleneck that the existing full-time four-wheel drive system can only change the ratio of front and rear axle torque distribution within a certain range, and can realize arbitrary distribution between the front and rear axles and rapid response; under limit conditions when one axle slips, all powertrain output torque can be transferred to another shaft with good adhesion, achieving single-axle drive. Compared with the hub motor drive, it is not necessary to reduce the total output power, thus ensuring the vehicle's power.

(3) The centralized full-time electric four-wheel drive system provided by the present disclosure solves the technical bottleneck that the existing full-time four-wheel drive system can only passively change the front and rear axle torque distribution according to the speed difference of the front and rear axles or the internal friction torque of the differential. The system can realize the function of actively changing the torque distribution ratio between the front and rear axles at any time, and the response is rapid.

(4) The centralized full-time electric four-wheel drive system provided by the present disclosure solves the problem that the existing full-time four-wheel drive system can only transfer the drive torque from the side with high rotating speed to the side with low rotating speed in the torque distribution. The system can realize the transfer of torque from the wheel or the shaft with the high speed to the side or the shaft with low speed. It can also realize the transfer of torque from the wheel or the shaft with the low speed to the side or the shaft with high speed.

(5) The centralized full-time electric four-wheel drive system provided by the present disclosure integrates a power source, a transmission system and a torque distribution mechanism, and adopts a centralized power source to complete driving of four wheels. The system has a compact structure and high integration. Compared with the distributed four-wheel drive system, the present disclosure does not need to control each hub motor separately, but only needs to control a dual rotor motor to simultaneously complete the torque directional distribution between the axles and the rear wheels, and the number of actuators is small. The control system is simple and reliable, the control is easy to implement, and the system is low in cost.

(6) The centralized full-time electric four-wheel drive system provided by the present disclosure does not increase the unsprung mass compared to the hub motor distributed four-wheel drive system, and does not affect the ride comfort of the vehicle.

(7) The centralized full-time electric four-wheel drive system provided by the present disclosure can be applied to the full-time electric four-wheel drive vehicles, and can also be applied to four-wheel drive hybrid vehicles or four-wheel drive internal combustion engine powered vehicles by changing the power source.

DETAILED DESCRIPTION OF THE PRESENT INVENTION

The present disclosure will be further described in detail below with reference to the accompanying drawings, so that the present disclosure can be implemented by those skilled in the art.

Figure 1:
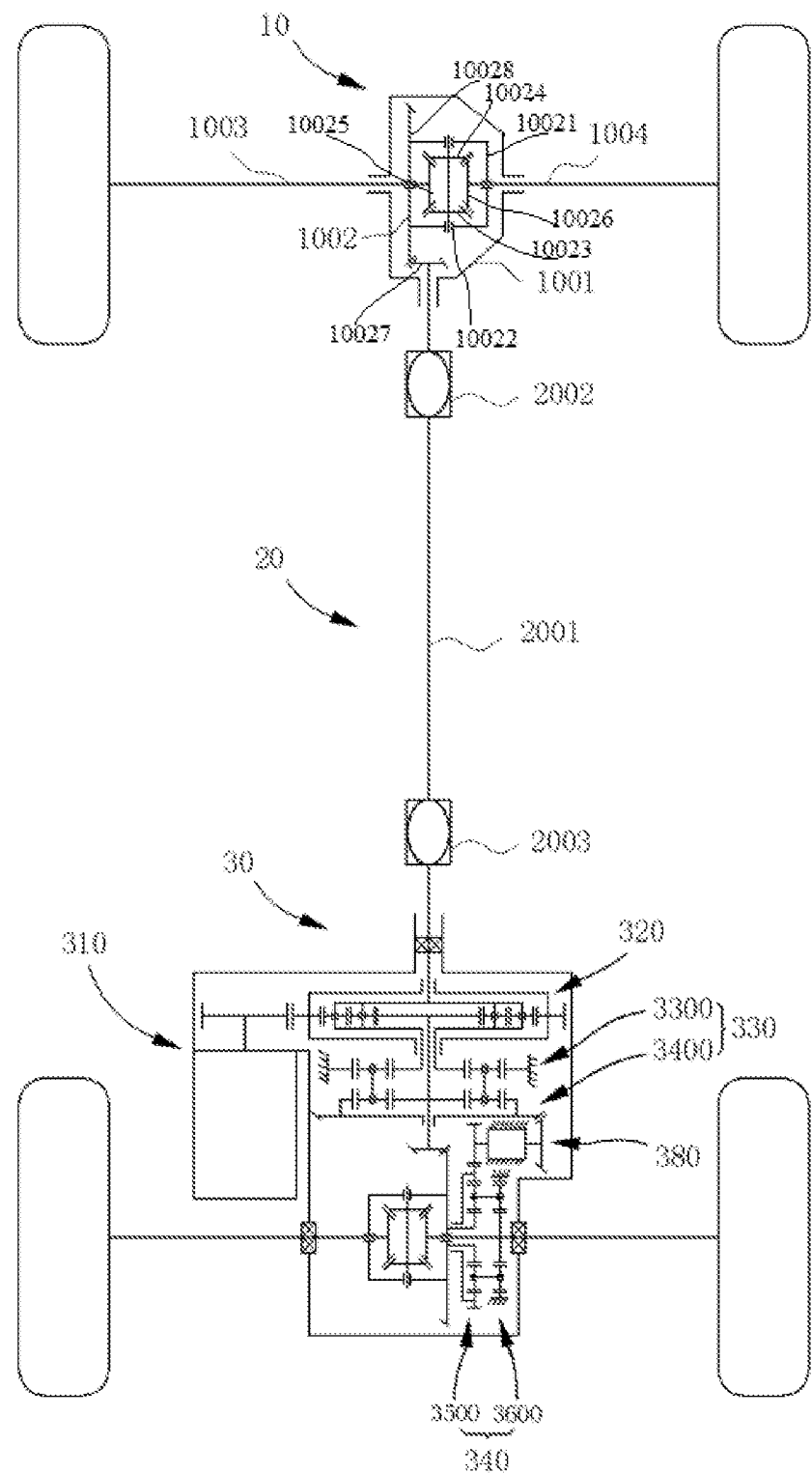
FIG. 1 is a schematic view showing the overall structure of the centralized full-time electric four-wheel drive system according to the present disclosure.

Referring to FIG. 1, the present disclosure provides a centralized full-time electric four-wheel drive system comprising primarily a front drive axle assembly 10, a driveshaft assembly 20 and an electric four-wheel drive system powertrain 30. The electric four-wheel drive system powertrain 30 is connected to the front drive axle assembly 10 through a driveshaft assembly 20 to transfer power to the front axle.

The front drive axle assembly 10 mainly comprises a front drive axle housing 1001, a second bevel gear differential assembly 1002, a front axle first half axle 1003, and a front axle second half axle 1004. The second bevel gear differential assembly 1002 is a conventional open bevel gear differential and mainly comprises a differential housing 10021, a second planetary gear shaft 10022, a third conical planetary gear 10023, and a fourth conical planetary gear shaft 10024, a third half axle gear 10025, a fourth half axle gear 10026 and the like. The second planetary gear shaft 10022 passes through the center of the second bevel gear differential housing 10021 and is rotatably supported thereon. The third conical planetary gear 10023 is fixedly mounted on the second planetary gear shaft 10022 and simultaneously meshes with the third half axle gear 10025 and the fourth half axle gear 10026. The fourth conical planetary gear 10024 is fixedly mounted on the second planetary gear shaft 10022 and simultaneously meshes with the third half axle gear 10025 and the fourth half axle gear 10026. The third conical planetary gear 10023 is symmetrically disposed with the fourth conical planetary gear 10024, the third half axle gear 10025 is spline-connected to the front axle first half axle 1003, and the fourth half axle gear 10026 is spline-connected to the front axle second half axle 1004. First and second half axles 1003 and 1004 of the front axle are connected to the left and right front axle driving wheels, and power is outputted to the left and right front axle driving wheels respectively. The second output shaft 3205 is connected to the driving bevel gear 10027 of the speed reduction mechanism through the transmission shaft assembly 20, the housing of the second bevel gear differential assembly 1002 is connected to the driven bevel gear 10028 of the speed reduction mechanism, and the driving bevel gear 10027 meshes with the driven bevel gear 10028 for transmission.

The transmission shaft assembly 20 mainly comprises a transmission shaft 2001, a universal transmission device 2002, and a universal transmission device 2003. The ends of the transmission shaft 2001 are connected to the universal transmission device 2002 and the universal transmission device 2003, respectively. The universal transmission device 2002 is connected to the front drive axle assembly 10. The universal transmission device 2003 is connected to the electric four-wheel drive system powertrain 30. When the front drive axle assembly 10 input end and the electric four-wheel drive system powertrain 30 output end are not coaxial, the universal transmission device can ensure that the two axles rotate substantially at the same time, and adapts to the angle and height difference between the two axles.

Figure 2:
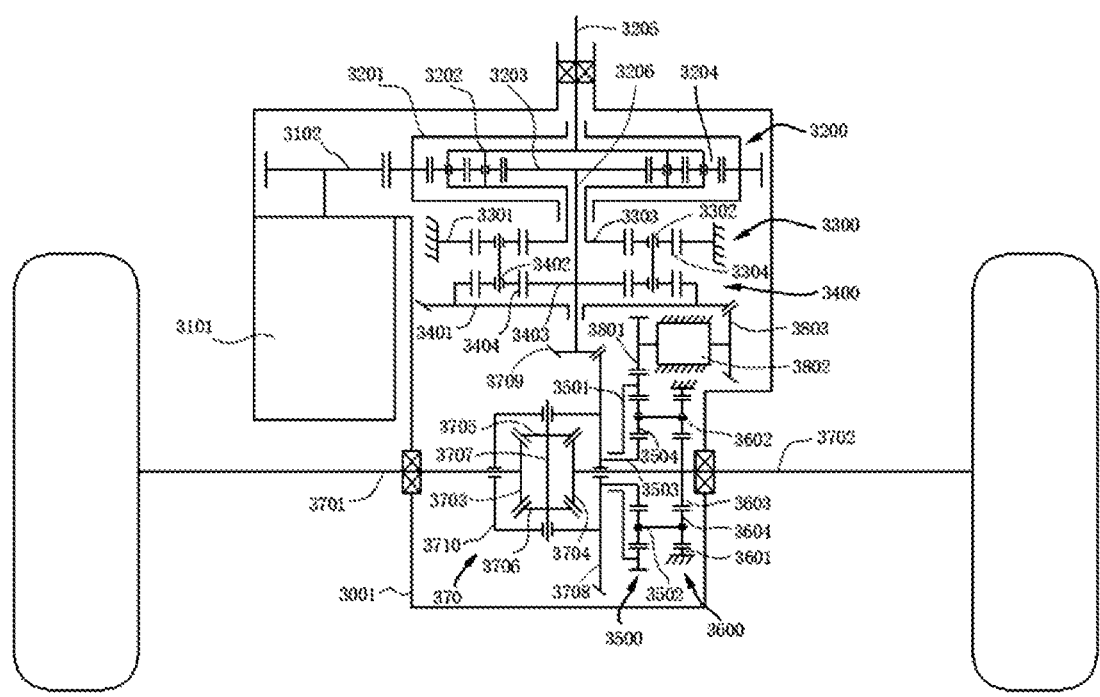
FIG. 2 is a schematic structural view of a powertrain assembly of the centralized full-time electric four-wheel drive system according to the present disclosure.

Referring to FIG. 1 and FIG. 2, the electric four-wheel drive system power assembly 30 mainly comprises a power output unit (main drive unit) 310, a center differential 320, an inter-axle torque distribution coupling planetary gear set 330, an inter-wheel torque distribution coupling planetary gear set 340, a first bevel gear differential assembly 370, a dual rotor motor output unit 380, and an electric four-wheel drive system powertrain housing 3001 are constructed.

The power output unit 310 mainly comprises a power source 3101 and an output gear 3102. The power source 3101 is fixed on the powertrain housing 3001, and may be a propulsion power source for an electric motor, an internal combustion engine or a hybrid powertrain. The output end of the power source 3101 is connected to the output gear 3102, and the output gear 3102 can output power externally. It should be noted that the addition of any gearing (i.e., transmission), clutch, or torque converter to the output of power source 3101 does not constitute a substantial innovation to the present disclosure.

The center differential 320 primarily comprises a fifth planetary gear set 3200, a second output shaft 3205 and a first output shaft 3206. The fifth planetary gear set 3200 is a two-stage planetary gear set, and comprises a fifth gear ring 3201, a third planetary carrier 3202, a fifth sun gear 3203, and two sets of three pairs of (six in total) circumferentially and uniformly arranged fifth planetary gears 3204. The fifth gear ring 3201 is rotatably supported on the shaft of the third planetary carrier 3202. The fifth gear ring

3201 is fixed with a circumferentially and uniformly arranged transmission gear and externally meshes with the output gear 3102, so that power outputted from the power output unit 310 outputs can be transmitted to the center differential 320. The first end of the third planetary carrier 3202 is fixedly connected or spline-connected to the second output shaft 3205 to transmit power, and the second end is fixedly connected or spline-connected to the first sun gear 3303 of the first planetary gear set 3300 to transmit power. The fifth sun gear 3203 is fixedly connected or spline-connected to the first output shaft 3206 to transmit power. The two sets of three pairs of (six in total) circumferentially and uniformly arranged fifth planetary gears 3204 are all sleeved and supported on the third planetary carrier 3202. On the one hand, they can revolve around a common axis of the second output shaft 3205 and the third planet 3202 as the third planetary carrier 3202 rotates, and on the other hand, they can also rotate about an axle (referred to as a planetary axle) to which the third planetary carrier 3202 is fixed through its central bore. Each pair of two fifth planetary gears 3204 that are in close proximity externally mesh with each other, the fifth planetary gear 3204 near the inner side externally meshes with the fifth sun gear 3203 while fifth planetary gear 3204 near the outer side internally meshes with the fifth gear ring 3201. The second output shaft 3205 is rotatably supported in the powertrain housing 3001 and connected to the universal transmission device transmission 2003, and the drive torque can be transmitted to the front axle through the transmission shaft assembly 20. The first output shaft 3206 can be rotatably supported in the bore shaft of the third planetary carrier 3202 and protrudes therefrom to be fixedly connected or spline-connected to the second sun gear 3403 of the second planetary gear set 3400 and the main reduction drive bevel gear 3709 to transmit power. To ensure that the center differential 320 can distribute the drive torque outputted from the power output unit 310 to the front and rear axles of the vehicle intactly, the planetary row characteristic parameter of the fifth planetary gear set 3200 must be equal to two.

The inter-axle torque distribution coupling planetary gear set 330 mainly comprises a first planetary gear set 3300 and a second planetary gear set 3400. Their planetary row characteristic parameters must be the same, and the types of planetary rows must be the same. The first planetary gear set 3300 comprises a first gear ring 3301, a first planetary carrier 3302, a first sun gear 3303, and three first planetary gears 3304 circumferentially and uniformly arranged. The first gear ring 3301 is fixed on the electric four-wheel drive system power assembly housing 3001, the first planetary carrier 3302 is integrated with the planetary carrier 3402 of the second planetary gear set 3400, and the first sun gear 3303 is a hollow shaft and is fixedly connected or spline-connected to the third planetary carrier 3202 of the differential and rotatably supported on the center differential first output shaft 3206. The three circumferentially and uniformly arranged first planetary gears 3304 are disposed between the first gear ring 3301 and the first sun gear 3303 and simultaneously mesh with the first gear ring and the first sun gear. The three first planetary gears 3304 are respectively sleeved and supported on the first planetary carrier 3402, and can rotate about its own central axis and revolve around the axis of the first output shaft 3206. The second planetary gear set 3400 comprises a second gear ring 3401, a planetary carrier 3402 (i.e., the first planetary carrier 3302), a second sun gear 3403, and three circumferentially and uniformly arranged second planetary gears 3404. A transmission bevel gear is fixed on the outer side of the second gear ring 3401, and meshes with the first output end gear 3803 of the dual rotor motor, so that the torque outputted from the first output end of the dual rotor motor can be transmitted to the second planetary gear set 3400. The second sun gear 3403 is spline-connected to first output shaft 3206. Three circumferentially and uniformly arranged second planetary gears 3404 are disposed between the second gear ring 3401 and the second sun gear 3403 and simultaneously mesh with the second gear ring and the second sun gear. The three first planetary gears 3304 are respectively sleeved and supported on the first planetary carrier 3402, and can rotate about its own central axis and revolve around the axis of the first output shaft 3206.

The inter-wheel torque distribution coupling planetary gear set 340 mainly comprises a fourth planetary gear set 3500 and a third planetary gear set 3600. Their planetary row characteristic parameters must be the same, and the types of planetary rows must be the same. The fourth planetary gear set 3500 comprises a fourth gear ring 3501, a planetary carrier 3502, a fourth sun gear 3503, and three circumferentially and uniformly arranged fourth planetary gears 3504. The fourth gear ring 3501 is externally and fixedly connected to a transmission gear and externally meshes with the second output gear 3801 of the second output end of the dual rotor motor, so that the torque outputted by the second output end of the dual rotor motor can be transmitted to the fourth planetary gear set 3500. The planetary carrier 3502 (i.e., the second planetary carrier 3602) is integral with the second planetary carrier 3602 of the third planetary gear set 3600. The fourth sun gear 3503 is a hollow shaft fixedly connected or spline-connected to the differential housing 3710 of the first bevel gear differential assembly 370. The three circumferentially and uniformly arranged fourth planetary gears 3504 are disposed between the fourth gear ring 3501 and the fourth sun gear 3503 and at the same time mesh with the fourth gear ring and the fourth sun gear. The three fourth planetary gears 3504 are respectively sleeved and supported on the planetary carrier 3502, and can rotate around its own central axis and revolve around the axis of the rear axle of the vehicle. The fourth gear ring 3501 is sleeved on the hollow shaft of the fourth sun gear 3503. The third planetary gear set 3600 comprises a third gear ring 3601, a second planetary carrier 3602, a third sun gear 3603, and three circumferentially and uniformly arranged third planetary gears 3604. The third gear ring 3601 is fixed on the electric four-wheel drive system power assembly housing 3001, and the third sun gear 3603 is spline-connected to the rear axle second half shaft 3702. Three circumferentially and uniformly arranged third planetary gears 3604 are disposed between the third gear ring 3601 and the third sun gear 3603 and simultaneously mesh with the third gear ring and the third sun gear. The three fourth planetary gears 3604 are respectively sleeved and supported on the planetary carrier 3602, and can rotate around its own central axis and revolve around the axis of the rear axle, that is, the rear axle second half shaft 3702.

The first bevel gear differential assembly 370 mainly comprises a rear axle first half shaft 3701, a rear axle second half shaft 3702, a first half axle gear 3703, a second half axle gear 3704, first and second conical planetary gears 3705 and 3706, a first planetary gear shaft 3707, a main reduction driven bevel gear 3708, a main reduction driving bevel gear 3709, and a differential housing 3710. The first half axle gear 3703 is spline-connected to the rear axle first half shaft 3701, and the rear axle first half shaft 3701 is rotatably supported in the powertrain housing 3001. The second half axle gear 3704 is spline-connected to the rear axle second half shaft 3702, and the rear axle second half shaft 3702 is rotatably supported in the powertrain housing 3001. The differential housing 3710 is rotatably supported on the rear axle first half shaft 3701 and the rear axle second half shaft 3702. The right end face of the differential housing 3710 is fixedly connected to the main reduction driven bevel gear 3708, and the main reduction driven bevel gear 3708 meshes with the main reduction drive bevel gear 3709. The first planetary gear shaft 3707 passes through the center of the differential housing 3710 and is rotatably supported on the differential housing 3710, and the first and second conical planetary gears 3705 and 3706 are mounted in the middle part thereof. The two conical planetary gears 3705 and 3706 are symmetrically disposed on the two sides with respect to the center of the differential, and respectively mesh with the first half axle gear 3703 and the second half axle gear 3704 disposed on the left and right sides thereof. The centers of the first half axle gear 3703 and the second side shaft gear 3704 are respectively spline-connected to the rear axle first half shaft 3701 and the rear axle second half shaft 3702. The rear axle first half shaft 3701 and the rear axle second half shaft 3702 respectively pass through the center holes on two sides of the differential housing 3710 and transfer the power to the left and right wheels of the rear axle through a constant velocity universal joint.

The dual rotor motor output unit 380 mainly comprises a dual rotor motor 3802, a second output end gear 3801, and a first output end bevel gear 3803. The dual rotor motor 3802 is fixed on the powertrain housing 3001. It should be noted that the dual-rotor motor 3802 can be any type of dual-rotor motor, as long as it has two independent power output ends. Therefore, change of the type of the dual rotor motor does not constitute a substantial innovation to the present disclosure. The second output end of the dual rotor motor 3802 is connected to the second output end gear 3801, and power can be externally outputted through the second output end gear 3801. The first output end of the dual rotor motor 3802 is connected to the first output end gear 3803, and power can be externally outputted through the first output end gear 3803.

The working principle of the centralized full-time electric four-wheel drive system according to the present disclosure is as follows:

The schematic view of the embodiment of the centralized full-time electric four-wheel drive system shown in FIG. 1 and FIG. 2 is taken as an example to illustrate the working principle.

Figure 3:
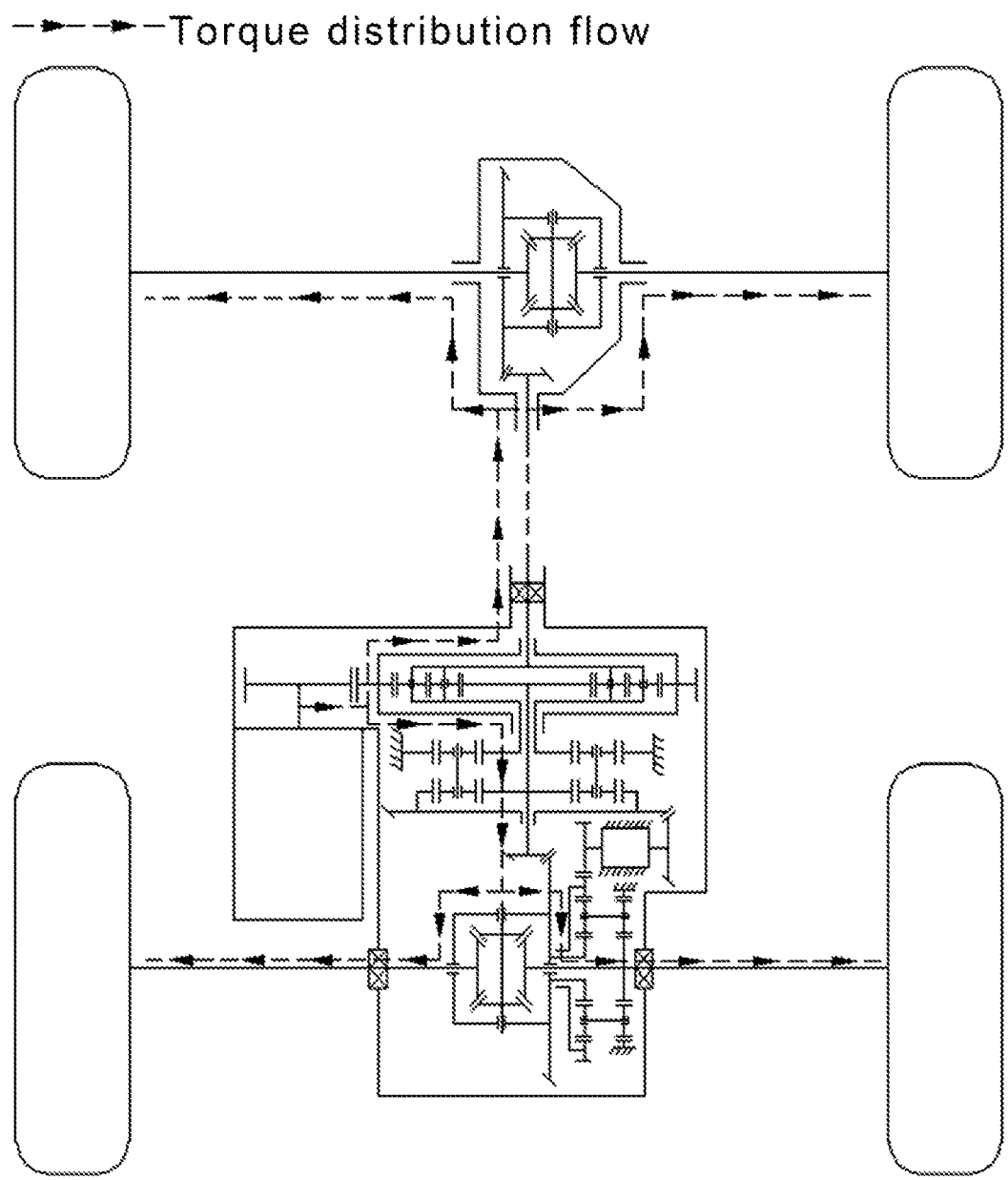
FIG. 3 is a schematic view showing the torque flow direction of the centralized full-time electric four-wheel drive system according to the present disclosure without a demand of active and directional torque distribution.

(1) When the centralized full-time electric four-wheel drive system works in normal straight-line driving conditions and there is no torque distribution requirement, there is no control signal in the dual rotor motor 3802, the dual rotor motor does not start and the first output end and the second output end do not output torque. At this time, the total drive torque outputted by the vehicle power output unit 310 passes through the center differential 320, and is equally distributed to the front and rear axles of the vehicle. The respective front axle drive torque and rear axle drive torque is equally distributed to the drive wheels on either side of the front and rear axles through the bevel gear differential assemblies 1002 and 370, and the final four wheels obtain the same magnitude of drive torque. The torque distribution flow is shown in FIG. 3.

At this time, since the car runs normally in a straight line and the rotational speeds of the four wheels are substantially the same, the second differential shaft 3205 of the center differential and the first output shaft 3206 of the center differential rotate at the same speed. Since the second output shaft 3205 is fixedly connected or spline-connected to one end of the third planetary carrier 3202 of the fifth planetary wheel train 3200 and the other end of the third planetary carrier 3202 is fixedly connected to the first sun gear 3303 of the first planetary gear set 3300, the rotational speed of the first sun gear 3303 is the same as the rotational speed of the first output shaft 3206 of the center differential. In addition, since the second sun gear 3403 of the second planetary gear set 3400 is spline-connected to the first output shaft 3206, the second sun gear 3403 has the same rotational speed as the first output shaft 3206, that is, the first sun gear 3303 has the same rotational speed as the second. sun gear 3403. Further, since the first planetary gear set 3300 and the second planetary gear set 3400 share a carrier, the first gear ring 3301 and the second gear ring 3401 have the same rotational speed. Moreover, since the first gear ring 3301 is fixed to the powertrain housing 3001 and the rotational speed is zero, the rotational speed of the second gear ring 3401 is also zero. Therefore, the first output end bevel gear 3803 of the dual rotor motor also has a rotational speed of zero, and the first output end of the dual rotor motor 3802 does not rotate. That is, the first output end of the dual rotor motor 3802 does not start and output any torque.

When the vehicle runs normally in a straight line, the wheels on the left and right sides of the rear axle rotate at the same speed, and the second half axle 3702 of the rear axle and the differential housing 3710 rotate at the same speed. Since the fourth sun gear 3503 of the fourth planetary gear set 3500 is fixedly connected or spline-connected to the differential housing 3710, the fourth sun gear 3503 and the rear axle second half shaft 3702 rotate at the same speed. Further, since the third sun gear 3603 of the third planetary gear set 3600 is spline-connected to the rear axle second half shaft 3702, the rotational speeds are the same, and therefore the rotational speeds of the third sun gear 3603 and the fourth sun gear 3503 are also the same. Since the fourth planetary gear set 3500 and the third planetary gear set 3600 share a carrier, the rotational speeds of the fourth gear ring 3501 and the third gear ring 3601 are also the same. Since the third gear ring 3601 is fixed on the powertrain housing 3001 and the rotational speed is zero, the rotational speed of the fourth gear ring 3501 that externally meshes with the second output end gear 3801 of the dual rotor motor is also zero. Therefore, the second output end gear 3801 of the dual rotor motor has a rotational speed of zero, and the second output end of the dual rotor motor 3802 does not rotate. That is, the second output end of the dual rotor motor 3802 does not start and output any torque.

(2) When the centralized full-time electric four-wheel drive system works in the working condition when the drive torque is distributed from the rear axle to the front axle, the rotational direction of the wheel is set to be positive when the vehicle travels forward and negative when the vehicle travels backward, and the planetary row characteristic parameters of the first planetary gear set 3300 and the second planetary gear set 3400 are both $k_1$. At this time, the second output end of the dual rotor motor 3802 does not start, and the output torque of the first output end of the dual rotor motor 3802 is $T_1$ ($T_1$ is a positive value). After the torque is transmitted by meshing of first output end gear 3803 and a bevel gear fixedly connected to the second gear ring 3401, the torque increment inputted to the second gear ring 3401 is $i_1 T_1$, where $i_1$ is the transmission ratio of the first output end bevel gear 3803 and the outer bevel gear of the second gear ring 3401. Therefore, the torque increment transmitted from the second sun gear 3403 of the second planetary gear set 3400 into the first output shaft 3206 of the center differential is $$-\frac{i_1 T_1}{k_1},$$

and the torque increment transmitted from the first sun gear 3303 of the first planetary gear set 3300 into the planetary carrier 3202 of the center differential 320, that is, the torque increment transmitted into the second differential shaft 3205 of the center differential is $$\frac{i_1 T_1}{k_1}.$$

Therefore, the drive torque of the front axle drive is increased by $$\frac{i_1 T_1}{k_1},$$

and the drive torque of the rear axle is reduced by $$\frac{i_1 T_1}{k_1}.$$

When the total drive torque is maintained constant, the distribution of the drive torque from the rear axle to front axle is realized, and distribution amount of the drive torque is $$\frac{i_1 T_1}{k_1}.$$

Figure 4:
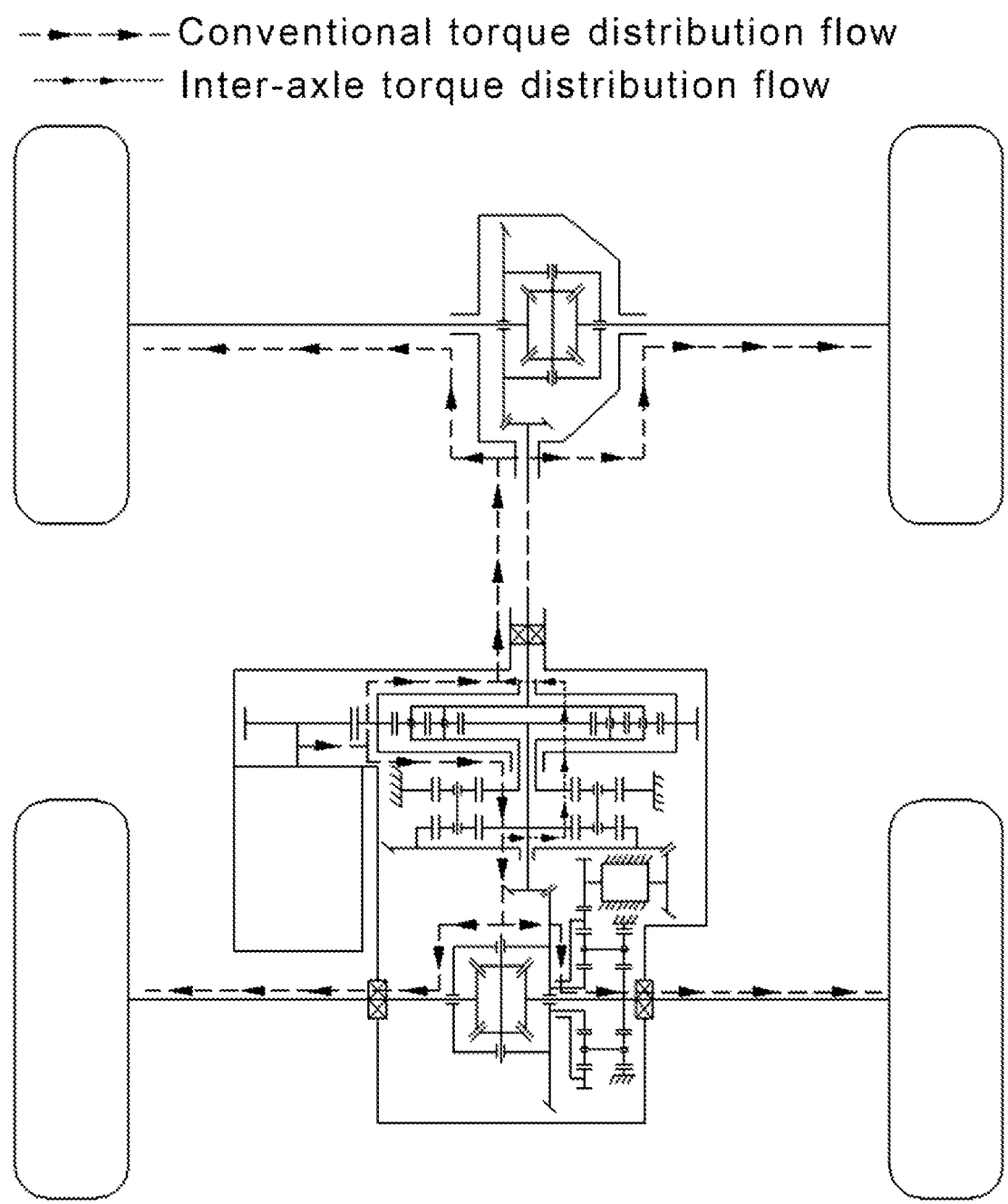
FIG. 4 is a schematic view showing the torque flow direction of the centralized full-time electric four-wheel drive system according to the present disclosure when the drive torque is actively distributed from the rear axle to the front axle.

The torque distribution flow is shown in FIG. 4.

(3) When the centralized full-time electric four-wheel drive system works in the working condition when the drive torque is distributed from the front axle to the rear axle, in a similar way, at this time, the second output end of the dual rotor motor 3802 does not start, and the output torque of the first output end of the dual rotor motor 3802 is $T_1$ ($T_1$ is a positive value). After the torque is transmitted by meshing of first output end gear 3803 and a bevel gear fixedly connected to the second gear ring 3401, the torque increment inputted to the second gear ring 3401 is $-i_1 T$. Therefore, the torque increment transmitted from the second sun gear 3403 of the second planetary gear set 3400 into the first output shaft 3206 of the center differential is $$\frac{i_1 T_1}{k_1},$$

and the torque increment transmitted from the first sun gear 3303 of the first planetary gear set 3300 into the planetary carrier 3202 of the center differential 320, that is, the torque increment transmitted into the second differential shaft 3205 of the center differential is $$-\frac{i_1 T_1}{k_1}.$$

Therefore, the drive torque of the front axle drive is reduced by $$\frac{i_1 T_1}{k_1},$$

and the drive torque of the rear axle is increased by $$\frac{i_1 T_1}{k_1}.$$

When the total drive torque is maintained constant, the distribution of the drive torque from the front axle to rear axle is realized, and distribution amount of the drive torque is $$\frac{i_1 T_1}{k_1}.$$

Figure 5:
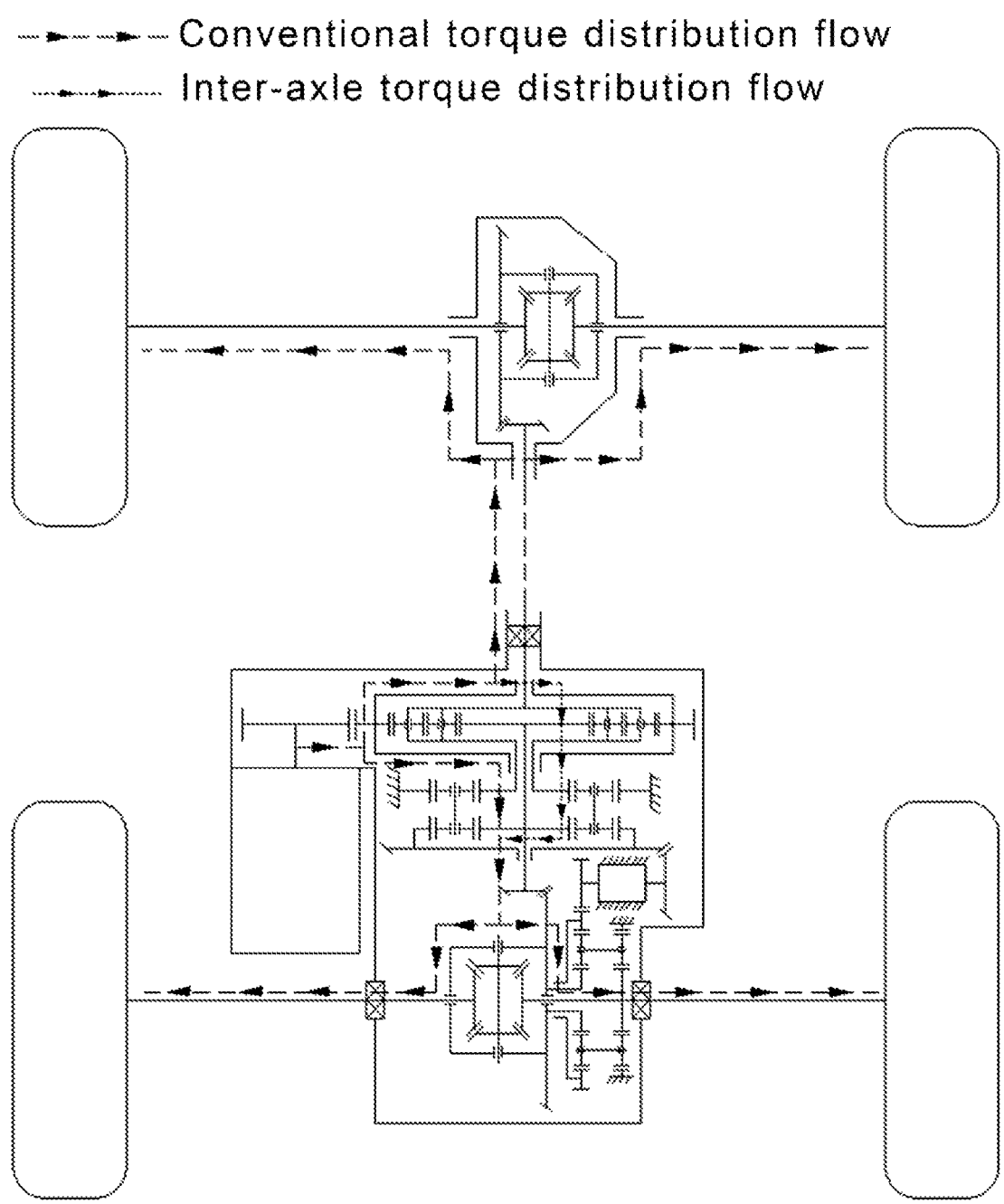
FIG. 5 is a schematic view showing the torque flow direction of the centralized full-time electric four-wheel drive system according to the present disclosure when the drive torque is actively distributed from the front axle to the rear axle.

The torque distribution flow is shown in FIG. 5.

(4) When the centralized full-time electric four-wheel drive system works in the working condition when the drive torque is distributed from the rear axle second half shaft to the rear axle first half shaft, the rotational direction of the wheel is set to be positive when the vehicle travels forward and negative when the vehicle travels backward, and the planetary row characteristic parameters of the fourth planetary gear set 3500 and the third planetary gear set 3600 are both $k_2$. At this time, the first output end of the dual rotor motor 3802 does not start, and the output torque of the second output end of the dual rotor motor 3802 is $T_2$ ($T_2$ is a positive value). After the torque is transmitted by meshing of second output end gear 3801 and a bevel gear fixedly connected to the fourth gear ring 3501, the torque increment inputted to the fourth gear ring 3501 is $-i_2 T_2$, where $i_2$ the transmission ratio of the second output end gear 3801 and the outer bevel gear of the fourth gear ring 3501. Therefore, the torque increment transmitted from the fourth sun gear 3503 of the fourth planetary gear set 3500 into the differential housing 3701 is $$\frac{i_2 T_2}{k_2},$$

and the torque increment transmitted from the third sun gear 3603 of the third planetary gear set 3600 into the rear axle second half shaft 3702 is $$-\frac{i_2 T_2}{k_2}.$$

The differential housing 3710 further distributes the obtained torque increment into the rear axle first half shaft 3701 and the rear axle second half shaft 3702, so that the final torque increment obtained by the rear axle first half shaft 3701 is $$\frac{i_2T_2}{2k_2},$$

and the total torque increment obtained by the rear axle second half shaft 3702 is $$\frac{i_2T_2}{2k_2}+\left(-\frac{i_2T_2}{k_2}\right)=-\frac{i_2T_2}{2k_2}.$$

Therefore, the drive torque of the rear axle first half shaft 3701 is increased by $$\frac{i_2T_2}{2k_2},$$

and the drive torque of the rear axle second half shaft 3702 is reduced by $$\frac{i_2T_2}{2k_2}.$$

When the total drive torque is maintained constant, the distribution of the drive torque from the rear axle second half shaft 3702 to the rear axle first half shaft 3701 is realized, and distribution amount of the drive torque is $$\frac{i_2T_2}{2k_2}.$$

Figure 6:
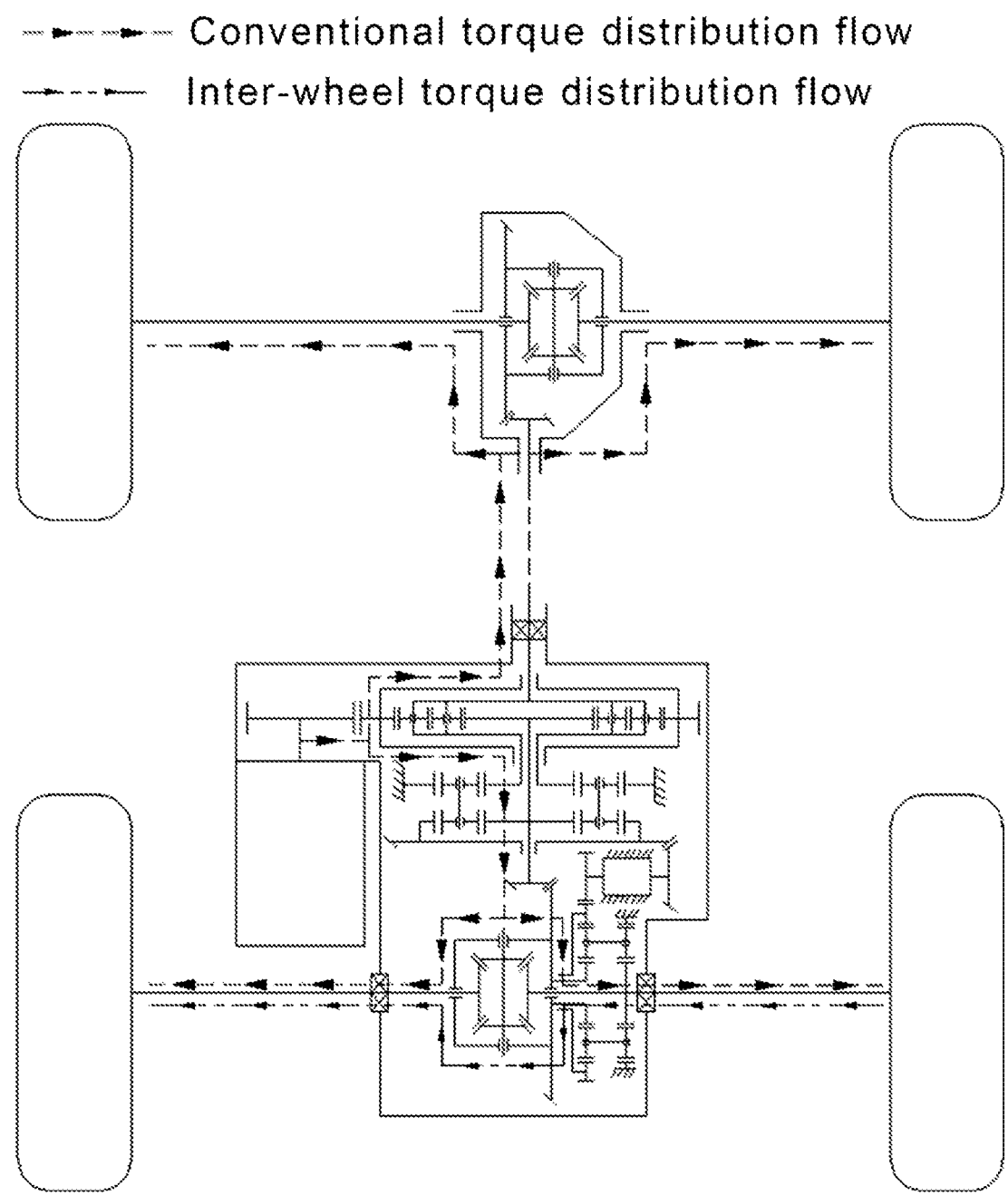
FIG. 6 is a schematic view showing the torque flow direction of the centralized full-time electric four-wheel drive system according to the present disclosure when the drive torque is actively distributed from the second half axle to the first half axis of the rear axle.

The torque distribution flow is shown in FIG. 6.

(5) When the centralized full-time electric four-wheel drive system works in the working condition when the drive torque is distributed from the rear axle first half shaft to the rear axle second half shaft, in a similar way, at this time, the first output end of the dual rotor motor 3802 does not start, and the output torque of the second output end of the dual rotor motor 3802 is $-T_2$ ($T_2$ is a positive value). After the torque is transmitted by meshing of second output end gear 3801 and a bevel gear fixedly connected to the fourth gear ring 3501, the torque increment inputted to the fourth gear ring 3501 is $i_2T_2$. Therefore, the torque increment transmitted from the fourth sun gear 3503 of the fourth planetary gear set 3500 into the differential housing 3701 is $$-\frac{i_2T_2}{k_2},$$

and the torque increment transmitted from the third sun gear 3603 of the third planetary gear set 3600 into the rear axle second half shaft 3702 is $$\frac{i_2T_2}{2k_2}.$$

The differential housing 3710 further distributes the obtained torque increment into the rear axle first half shaft 3701 and the rear axle second half shaft 3702, so that the final torque increment obtained by the rear axle first half shaft 3701 is $$-\frac{i_2T_2}{2k_2},$$

and the total torque increment obtained by the rear axle second half shaft 3702 is $$-\frac{i_2T_2}{2k_2}+\frac{i_2T_2}{k_2}=\frac{i_2T_2}{2k_2}.$$

Therefore, the drive torque of the rear axle first half shaft 3701 is reduced by $$\frac{i_2T_2}{2k_2},$$

and the drive torque of the rear axle second half shaft 3702 is increased by $$\frac{i_2T_2}{2k_2}.$$

When the total drive torque is maintained constant, the distribution of the drive torque from the rear axle first half shaft 3701 to the rear axle second half shaft 3702 is realized, and distribution amount of the drive torque is $$\frac{i_2T_2}{2k_2}.$$

Figure 7:
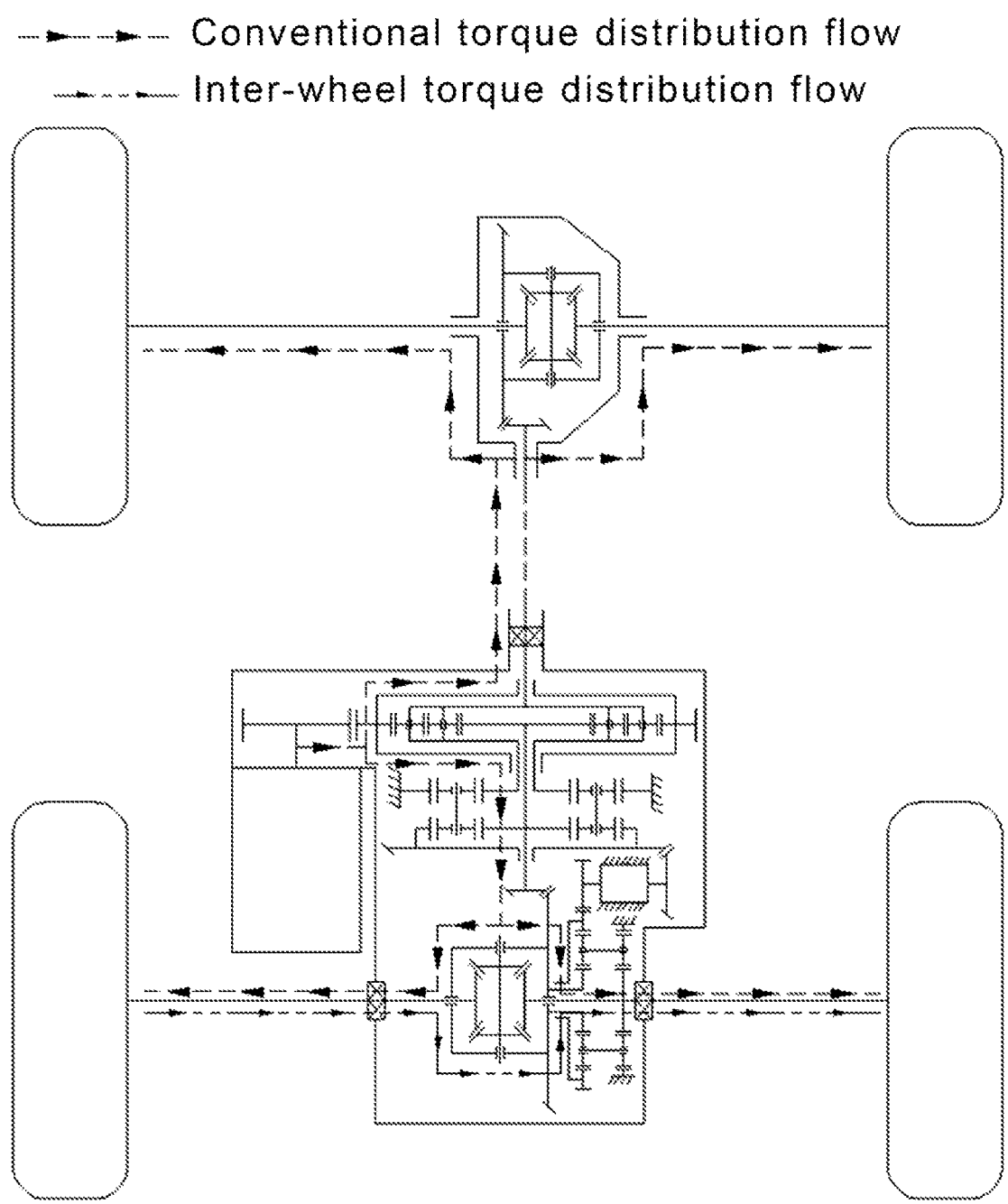
FIG. 7 is a schematic view showing the torque flow direction of the centralized full-time electric four-wheel drive system according to the present disclosure when the drive torque is actively distributed from the first half axle to the second half axis of the rear axle.

The torque distribution flow is shown in FIG. 7.

(6) When the centralized full-time electric four-wheel drive system works in the working condition when the inter-axle and inter-wheel distribution of drive torque are both needed, e.g., when the drive torque is distributed from the rear axle to the front axle and from the rear axle second half shaft to the rear axle first half shaft, the rotational direction of the wheel is set to be positive when the vehicle travels forward and negative when the vehicle travels backward, the planetary row characteristic parameters of the first planetary gear set 3300 and the second planetary gear set 3400 are both $k_1$ and the planetary row characteristic parameters of the fourth planetary gear set 3500 and the third planetary gear set 3600 are both $k_2$. At this time, the output torque of the first output end of the dual rotor motor 3802 is $T_1$ ($T_1$ is a positive value), and the output torque of the second output end of the dual rotor motor 3802 is $T_2$ ($T_2$ is a positive value).

When the output torque of the first output end of the dual rotor motor 3802 is $T_1$ ($T_1$ is a positive value), after the torque is transmitted by meshing of first output end gear 3803 and a bevel gear fixedly connected to the second gear ring 3401, the torque increment inputted to the second gear ring 3401 is $i_1T_1$, where $i_1$ is the transmission ratio of the first output end bevel gear 3803 and the outer bevel gear of the second gear ring 3401. Therefore, the torque increment transmitted from the second sun gear 3403 of the second planetary gear set 3400 into the first output shaft 3206 of the center differential is $$-\frac{i_1 T_1}{k_1},$$

and the torque increment transmitted from the first sun gear 3303 of the first planetary gear set 3300 into the planetary carrier 3202 of the center differential 320, that is, the torque increment transmitted into the second differential shaft 3205 of the center differential is $$\frac{i_1 T_1}{k_1}.$$

Therefore, the drive torque of the front axle drive is increased by $$\frac{i_1 T_1}{k_1},$$

and the drive torque of the rear axle is reduced by $$\frac{i_1 T_1}{k_1}.$$

When the output torque of the second output end of the dual rotor motor 3802 is $T_2$ ($T_2$ is a positive value), after the torque is transmitted by meshing of second output end gear 3801 and a bevel gear fixedly connected to the fourth gear ring 3501, the torque increment inputted to the fourth gear ring 3501 is $-i_2 T_2$, where $i_2$ is the transmission ratio of the second output end gear 3801 and the outer bevel gear of the fourth gear ring 3501. Therefore, the torque increment transmitted from the fourth sun gear 3503 of the fourth planetary gear set 3500 into the differential housing 3701 is $$\frac{i_2 T_2}{k_2},$$

and the torque increment transmitted from the third sun gear 3603 of the third planetary gear set 3600 into the rear axle second half shaft 3702 is $$-\frac{i_2 T_2}{k_2}.$$

The differential housing 3710 further distributes the obtained torque increment into the rear axle first half shaft 3701 and the rear axle second half shaft 3702, so that the torque increment obtained by the rear axle first half shaft 3701 is $$\frac{i_2 T_2}{2k_2},$$

and the total torque increment obtained by the rear axle second half shaft 3702 is $$\frac{i_2 T_2}{2k_2} + \left(-\frac{i_2 T_2}{k_2}\right) = -\frac{i_2 T_2}{2k_2}.$$

Further, considering that the torque transfer from the rear axle to the front axle is $$\frac{i_1 T_1}{k_1},$$

therefore, the drive torque of the rear axle first half shaft 3701 is varied by $$\frac{i_2 T_2}{2k_2} - \frac{i_1 T_1}{2k_1},$$

and the drive torque of the rear axle second half shaft 3702 is varied by $$-\frac{i_2 T_2}{2k_2} - \frac{i_1 T_1}{2k_1}.$$

Figure 8:
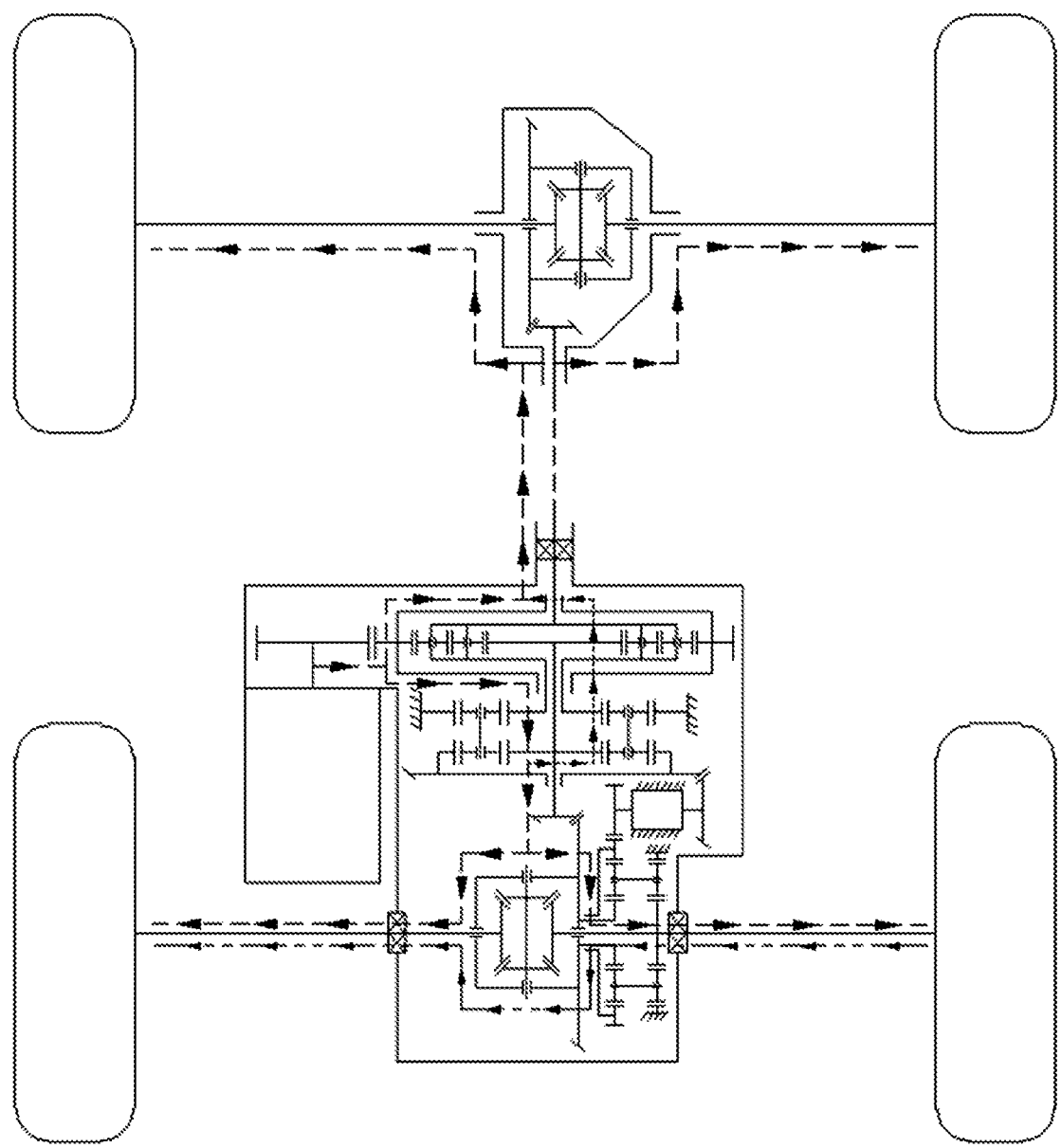
FIG. 8 is a schematic vie showing the torque flow direction of the centralized full-time electric four-wheel drive system according to the present disclosure when the drive torque is actively distributed simultaneously from the rear axle to the front axle and from the second half axle to the first half axis of the rear axle.

When the total drive torque is maintained constant, the distribution of the drive torque from the rear axle to the front axle and from the rear axle second half shaft to the rear axle first half shaft is realized. The torque distribution flow is shown in FIG. 8.

According to the working principle of the above-mentioned centralized full-time electric four-wheel drive system, the electric four-wheel drive system has independent inter-axle torque distribution coupling planetary gear set and inter-wheel torque distribution coupling planetary gear set, and separate control of inter-axle torque distribution and inter-wheel torque distribution can be realized. By controlling the magnitude and direction of the output torque of the second output end of the dual rotor motor 3802, it is possible to control the magnitude and direction of torque distribution between wheels of the rear axle of the vehicle. By controlling the magnitude and direction of the output torque of the first output end of the dual rotor motor 3802, it is possible to control the magnitude and direction of the torque distribution between the axles of the vehicle. Therefore, the electric four-wheel drive system of the torque directional distribution function of the present disclosure has four working modes, namely a torqueless distribution mode, an inter-axle torque distribution mode, an inter-wheel torque distribution mode, and a four-wheel cooperative torque distribution mode. In the torqueless distribution mode, neither of the first output end nor the second output end of the dual rotor motor 3802 outputs torque, and the vehicle is only driven by the power source 3101 to travel. In the inter-axle torque distribution mode, the second output end of the dual-rotor motor 3802 does not output torque, and the first output end outputs torque to control the inter-axle torque distribution of the vehicle. In the inter-wheel torque distribution mode, the first output end does not output torque, and the second output end of the dual-rotor motor 3802 outputs torque to control the torque distribution between wheels of the rear axle of the vehicle. In the four-wheel cooperative torque distribution mode, the first output end and the second output end of the dual-rotor motor 3802 simultaneously output different torques to control the inter-axle torque distribution of the vehicle and the torque distribution between wheels of the rear axle. The output torque of the two output ends of the dual rotor motor 3802 can be determined by the vehicle controller transmitting commands through a bus. Preferably, the vehicle controller (not shown) comprehensively determine the output torque commands of the two output ends of the dual rotor motor 3802 based on the driver mode, the vehicle operating condition (linear acceleration start, straight line uniform speed, cornering uniform speed or cornering acceleration, etc.), slippage situations of the front and rear axles, the vehicle speed and the dynamics parameters (yaw rate, centroid side angle, etc.) and the maximum torque parameters of the dual rotor motor. The purpose is to meet the driver's different performance requirements for the vehicle under various specific working conditions, such as power, economy, turning maneuverability, steering stability or passage ability, or to meet the above overall performance of the vehicle under common working conditions.

The centralized full-time electric four-wheel drive system provided by the present disclosure solves the drawbacks of the conventional differential "different speed-same torque", and can realize the function of "different speed-different torque". That is, in the case that speed between axles or wheels is different, a same addition or subtraction of any absolute value can be carried out on the torques of both sides of the differential to achieve unequal power output between both sides or front and rear axles. This fundamental technical feature can meet the requirements for the vehicle's power, economy, cornering maneuverability, steering stability and passage ability, thus improving the overall performance of the vehicle.

Although the embodiments of the present disclosure have been disclosed in the above, the present disclosure is not limited to the applications listed in the specification and the embodiments, and is fully applicable to various fields suitable for the present disclosure. For those skilled in the art, the present disclosure is not limited to the specific details and the details shown and described herein, without departing from the scope of the appended claims.

What is claimed is:

1. A centralized full-time electric four-wheel drive system, comprising:
   a main drive unit, a power output shaft of the main drive unit meshing with a gear ring of a center differential;
   wherein a sun gear of the center differential is connected to a first output shaft, a planetary carrier of the center differential is connected to a second output shaft, the first output shaft is connected to a housing of a first bevel gear differential through a speed reduction mechanism, and the second output shaft is connected to a housing of a second bevel gear differential through the speed reduction mechanism;
   a first planetary gear set comprising a first sun gear, a first planetary gear, a first planetary carrier, and a first gear ring;
   a second planetary gear set comprising a second sun gear, a second planetary gear, and a second gear ring;
   wherein the first sun gear is connected to the planetary carrier of the center differential and is sleeved on the first output shaft, the second sun gear is connected to the first output shaft, the first planetary gear and the second planetary gear are coaxially disposed on the first planetary carrier, and the second gear ring is sleeved on the first output shaft;
   a third planetary gear set comprising a third sun gear, a third planetary gear, a second planetary carrier, and a third gear ring;
   a fourth planetary gear set comprising a fourth sun gear, a fourth planetary gear and a fourth gear ring;
   wherein the third sun gear is connected to a second half axle of a rear axle, the fourth sun gear is connected to the housing of the first bevel gear differential and is sleeved on the second half axle of the rear axle, the third planetary gear and the fourth planetary gear are coaxially disposed on the second planetary carrier, a first half axle gear of the first bevel gear differential is connected to a first half axle of the rear axle, and a second half axle gear of the first bevel gear differential is connected to the second half axle of the rear axle; and
   a dual rotor motor having a first output end gear and a second output end gear disposed at either end thereof, the first output end gear meshing with the second gear ring, the second output end gear meshing with the fourth gear ring.

2. The centralized full-time electric four-wheel drive system of claim 1, wherein the center differential further comprises a fifth planetary gear that is uniformly distributed circumferentially about the planetary carrier of the center differential and sleeved and supported on the planetary carrier of the center differential in a centrally hollowed manner, the fifth planetary gear comprises two adjacent fifth planetary gears which mesh with one another, inner sides of the fifth planetary gears mesh with the sun gear of the center differential, and outer sides of the fifth planetary gears mesh with the gear ring of the center differential.

3. The centralized full-time electric four-wheel drive system of claim 1, wherein the first bevel gear differential further comprises:
   a first planetary gear shaft passing through a center of the housing of the first bevel gear differential and rotatably supported on the housing of the first bevel gear differential;
   a first conical planetary gear fixedly mounted on the first planetary gear shaft and simultaneously externally meshing with the first half axle gear and the second half axle gear; and
   a second conical planetary gear fixedly mounted on the first planetary gear shaft and simultaneously externally meshing with the first half axle gear and the second half axle gear;
   wherein the first conical planetary gear and the second conical planetary gear are symmetrically disposed.

4. The centralized full-time electric four-wheel drive system of claim 1, wherein a third half axle gear of the second bevel gear differential is connected to a first half axle of a front axle, and a fourth half axle gear of the second bevel gear differential is connected to a second half axle of the front axle.

5. The centralized full-time electric four-wheel drive system of claim 4, wherein the second bevel gear differential further comprises:
   a second planetary gear shaft passing through a center of the housing of the second bevel gear differential and rotatably supported on the housing of the second bevel gear differential;

a third conical planetary gear fixedly mounted on the second planetary gear shaft and simultaneously externally meshing with the third half axle gear and the fourth half axle gear; and a fourth conical planetary gear fixedly mounted on the second planetary gear shaft and simultaneously externally meshing with the third half axle gear and the fourth half axle gear;

wherein the third half axle gear and the fourth half axle gear are symmetrically disposed.

6. The centralized full-time electric four-wheel drive system of claim 1, wherein the first planetary gear and the second planetary gear are uniformly distributed circumferentially about the first planetary carrier and sleeved and supported on the first planetary carrier in a centrally hollowed manner; an inner side of the first planetary gear meshes with the first sun gear, and an outer side of the first planetary gear meshes with the first gear ring; an inner side of the second planetary gear meshes with the second sun gear, and an outer side of the second planetary gear meshes with the second gear ring.

7. The centralized full-time electric four-wheel drive system according to claim 1, wherein the third planetary gear and the fourth planetary gear are uniformly distributed circumferentially about the second planetary carrier and sleeved and supported on the second planetary carrier in a centrally hollowed manner; an inner side of the third planetary gear meshes with the third sun gear, and an outer side of the third planetary gear meshes with the third gear ring; an inner side of the fourth planetary gear meshes with the fourth sun gear, and an outer side of the fourth planetary gear meshes with the fourth gear ring.

8. The centralized full-time electric four-wheel drive system according to claim 1, wherein the power output shaft of the main drive unit meshes with the gear ring of the center differential through an output gear; the first output shaft is connected to a driving bevel gear of the speed reduction mechanism, the housing of the first bevel gear differential is connected to a driven bevel gear of the speed reduction mechanism, the driving bevel gear and the driven bevel gear meshes with each other for transmission.

9. The centralized full-time electric four-wheel drive system according to claim 1, wherein the second output shaft is connected to the second bevel gear differential through a transmission shaft, a universal transmission device is arranged at each end of the transmission shaft.

10. The centralized full-time electric four-wheel drive system according to claim 1, wherein a planetary row characteristic parameter of the center differential is 2; a planetary row characteristic parameter of the first planetary gear set is equal to that of the second planetary gear set; and a planetary row characteristic parameter of the third planetary gear set is equal to that of the fourth planetary gear set.

* * * * *